(12) United States Patent
Tomizawa et al.

(10) Patent No.: US 8,233,007 B2
(45) Date of Patent: Jul. 31, 2012

(54) DISPLAY DEVICE, METHOD FOR GENERATING FOUR OR MORE PRIMARY COLOR SIGNALS, AND PROGRAM CAUSING COMPUTER TO EXECUTE PROCESSING FOR GENERATING FOUR OR MORE PRIMARY COLOR SIGNALS

(75) Inventors: Kazunari Tomizawa, Kizugawa (JP); Shun Ueki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 718 days.

(21) Appl. No.: 12/375,741

(22) PCT Filed: Jul. 30, 2007

(86) PCT No.: PCT/JP2007/064911
§ 371 (c)(1),
(2), (4) Date: Jan. 30, 2009

(87) PCT Pub. No.: WO2008/016015
PCT Pub. Date: Feb. 7, 2008

(65) Prior Publication Data
US 2009/0322779 A1    Dec. 31, 2009

(30) Foreign Application Priority Data

Aug. 2, 2006  (JP) .................................. 2006-210898

(51) Int. Cl.
*G09G 5/02* (2006.01)
(52) U.S. Cl. ........................................ 345/589; 345/603
(58) Field of Classification Search .................. 345/589, 345/604, 613, 581
See application file for complete search history.

(56) References Cited

U.S. PATENT DOCUMENTS

| 4,800,375 A | 1/1989 | Silverstein et al. |
| 2004/0174389 A1 | 9/2004 | Ben-David et al. |
| 2005/0122294 A1 | 6/2005 | Ben-David et al. |
| 2005/0206979 A1 | 9/2005 | Tomizawa et al. |

(Continued)

FOREIGN PATENT DOCUMENTS

CN    1671214 A    9/2005

(Continued)

OTHER PUBLICATIONS

Japanese Application JP 06-261332, A(1994); Machine Translation.*

(Continued)

*Primary Examiner* — Xiao Wu
*Assistant Examiner* — Kim-Thanh T Tran
(74) *Attorney, Agent, or Firm* — Keating & Bennett, LLP

(57) ABSTRACT

A display device using a number n of primary colors (where n is a natural number that is equal to or greater than four) includes a video signal converting section that receives an m-primary-color signal representing a number m of primary colors (where is m is also a natural number that is smaller than n) and that converts the m-primary-color signal into an n-primary -color signal representing the n primary colors. The n primary colors include a color that is complementary to a particular one of the m primary colors. The video signal converting section generates the n-primary-color signal such that if a color component representing the particular primary color of the m-primary-color signal has a negative level, the complementary primary color has an increased luminance and the other non-complementary primary colors have decreased luminances compared to a situation where the color component representing the particular primary color is zero.

13 Claims, 10 Drawing Sheets

U.S. PATENT DOCUMENTS

2006/0038953 A1 2/2006 Moriya

FOREIGN PATENT DOCUMENTS

| JP | 06-261332 A | 9/1994 |
| JP | 09-251160 A | 9/1997 |
| JP | 2001-209047 A | 8/2001 |
| JP | 2001-306023 A | 11/2001 |

OTHER PUBLICATIONS

English translation of the Official communication issued in counterpart International Application No. PCT/JP2007/064911, mailed on Feb. 19, 2009.

Official Communication issued in International Patent Application No. PCT/JP2007/064911, mailed on Aug. 28, 2007.

Pointer; "The Gamut of Real Surface Colours"; Color Research and Application; vol. 5; No. 3; pp. 145-155; Fall 1980.

Yang et al.: "Development of Six Primary-Color LCD," Society for Information Display 05 Digest; vol. 36; Book 2; pp. 1210-1213; May 25-27, 2005.

Chino et al.: "Development of Wide-Color-Gamut Mobile Displays With Four-Primary-Color LCDS," Society for Information Display 06 Digest; vol. 37; Book 2; pp. 1221-1224; Jun. 7-9, 2006.

Ben-Chorin: "Improving LCD TV Color Using Multi-Primary Technology," FPD International 2005 Forum; 60 pgs; Oct. 19, 2005.

Official Communication issued in corresponding Chinese Patent Application No. 200780028912.8, mailed on Jan. 13, 2011.

\* cited by examiner

|        | MPC-R | MPC-G | MPC-B | MPC-Y | MPC-C |
|--------|-------|-------|-------|-------|-------|
| EBU-R  | 1.015 | 0.000 | 0.010 | 0.094 | 0.000 |
| EBU-G  | 0.000 | 3.350 | 0.000 | 0.192 | 0.065 |
| EBU-B  | 0.040 | 0.000 | 1.050 | 0.000 | 0.084 |
| EBU-Y  | 0.220 | 1.293 | 0.000 | 1.294 | 0.160 |
| EBU-C  | 0.000 | 1.870 | 0.000 | 0.520 | 1.950 |
| EBU-M  | 1.180 | 0.000 | 0.820 | 0.000 | 0.480 |
| EBU-W  | 0.420 | 1.000 | 0.440 | 1.000 | 1.000 |

OUTPUT
Rout = DR × Rr + DY × Yr + NB × Br-
Gout = DR × Rg + DY × Yg + NB × Bg-
Bout = DR × Rb + DY × Yb + NB × Bb-
Yout = DR × Ry + DY × Yy + NB × By-
Cout = DR × Rc + DY × Yc + NB × Bc-

DISPLAY DEVICE, METHOD FOR GENERATING FOUR OR MORE PRIMARY COLOR SIGNALS, AND PROGRAM CAUSING COMPUTER TO EXECUTE PROCESSING FOR GENERATING FOUR OR MORE PRIMARY COLOR SIGNALS

BACKGROUND OF THE INVENTION

1. Field of the Invention

The present invention relates to a display device that conducts a display operation using four or more primary colors.

2. Description of the Related Art

Various types of display devices are currently used in a variety of applications. In a general display device, one pixel consists of three subpixels respectively representing red, green and blue, which are the three primary colors of light, thereby conducting a display operation in colors.

A conventional display device, however, can reproduce colors that fall within only a narrow range (which is usually called a "color reproduction range"), which is a problem. FIG. 13 shows the color reproduction range of a conventional display device that conducts a display operation using the three primary colors. Specifically, FIG. 13 shows an xy chromaticity diagram according to the XYZ color system, in which the triangle, formed by the three points corresponding to the three primary colors of red, green and blue, represents the color reproduction range. Also plotted by symbols "X", in FIG. 13 are the surface colors of various objects existing in nature, which were disclosed in M. R. Pointer, "The Gamut of Real Surface Colors", Color Research and Application, Vol. 5, No. 3, pp. 145-155 (1980). As can be seen from FIG. 13, there are some object colors that do not fall within the color reproduction range, and therefore, a display device that conducts a display operation using the three primary colors cannot reproduce some object colors. It should be noted that the color reproduction range of a display device is often represented as a ratio to a reference color reproduction range that was defined by some association such as EBU (European Broadcasting Union) or NTSC (National Television System Committee). And such a ratio is called an "EBU ratio" or an "NTSC ratio", for example.

As described above, since a conventional display device has too narrow a color reproduction range to reproduce some colors (i.e., the colors outside of the color reproduction range) even if the image capture device can record colors in a broad range including those non-reproducible colors. That is why at any stage of signal processing to be done by either the image capture device or the display device, those colors outside of the color reproduction range of the display device need to be corrected and converted into colors that fall within that color reproduction range. Hereinafter, it will be described exactly how that signal processing can be done.

For example, a normal TV program is broadcast by transmitting a YCrCb signal including a luminance signal Y and two chrominance signals Cr and Cb. The YCrCb signal that has been transmitted is converted into an RGB signal including components that represent the respective luminances (i.e., grayscales) of red, green and blue, and the display device conducts a display operation based on this RGB signal.

If every signal level available were used, the YCrCb signal itself could represent those colors outside of the color reproduction range defined by the EBU standard. However, if the YCrCb signal representing those colors that do not comply with the EBU standard were simply converted into an RGB signal, at least one of the red, green and blue components would have a negative level. The conventional display device cannot reproduce such colors that are not compliant with the EBU standard. That is why if an RGB signal including such a component with the negative level is input, those colors can be corrected into colors that are compliant with the EBU standard that can be reproduced by the display device by regarding the negative level component as zero (which is called "clipping").

For example, if a YCrCb signal representing the color cyan that is not compliant with the EBU standard as shown in FIG. 16 (which is indicated by the point R– in FIG. 16) were converted into an RGB signal, then the red component would have a negative level, thus generating a signal representing a so-called "negative grayscale". The conventional display device cannot reproduce such a color cyan as it is, and therefore, presents such a color after correcting it into a color cyan compliant with the EBU standard (which is indicated by the point R0 in FIG. 16) by clipping the red component and regarding it to be zero. By performing such correction processing, even the conventional display device can also reproduce such a color. However, as the reproduced color is a corrected one, the natural object color cannot still be reproduced, which is a problem.

Meanwhile, in order to broaden the color reproduction range of display devices, a technique that uses an increased number of primary colors for display purposes has recently been proposed.

For example, PCT International Application Japanese National-Phase Publication No. 2004-529396 discloses a liquid crystal display device 800 in which one pixel P consists of six subpixels representing the colors red, green, blue, yellow, cyan and magenta, respectively, as shown in FIG. 14. The color reproduction range of such a liquid crystal display device 800 is shown in FIG. 15. As shown in FIG. 15, the color reproduction range, represented by a hexagon of which the vertices correspond to those six primary colors, covers almost all object colors. By increasing the number of primary colors for use in display in this manner, the color reproduction range can be broadened. Such display devices that conduct a display operation using four or more primary colors will be collectively referred to herein as "multi-primary-color display devices".

However, the conventional broadcasting standards suppose the use of a display device that conducts a display operation using the three primary colors. That is why even by simply adopting a multi-primary-color display device such as the one disclosed in PCT International Application Japanese National-Phase Publication No. 2004-529396, that broad color reproduction range of the multi-primary-color display device cannot be made full use of, and a display operation cannot be conducted with a sufficiently broad color reproduction range, either.

For example, if a signal representing a negative grayscale were clipped as in the conventional display device, then the color reproduction range realized would be almost no different from the one realized by the conventional device after all. And nobody has ever established a technique for getting colors to be represented by a video signal, including a negative level component, reproduced by a multi-primary-color display device with fidelity.

SUMMARY OF THE INVENTION

In order to overcome the problems described above, preferred embodiments of the present invention provide a display device that can reproduce the colors to be represented by a video signal, including a negative level component, with high fidelity and that can conduct a display operation in a sufficiently broad color reproduction range.

A display device according to a preferred embodiment of the present invention is designed to conduct a display operation using a number n of primary colors (where n is a natural number that is equal to or greater than four). The device includes a video signal converting section that receives an m-primary-color signal representing a number m of primary colors (where is m is also a natural number that is smaller than n) and that converts the m-primary-color signal into an n-primary-color signal representing the n primary colors. The n primary colors include a color that is complementary to a particular one of the m primary colors. The video signal converting section generates the n-primary-color signal such that if a color component representing the particular primary color of the m-primary-color signal has a negative level, the complementary primary color has an increased luminance and the other non-complementary primary colors have decreased luminances compared to a situation where the color component representing the particular primary color is zero.

In one preferred embodiment, the video signal converting section generates an isochromatic converted color signal by subjecting the m-primary-color signal to an isochromatic conversion and also generates the respective color components of the n-primary-color signal by making a linear combination of the respective color components of the isochromatic converted color signal.

In this particular preferred embodiment, the isochromatic converted color signal includes the color component representing the particular primary color. In the color component representing the particular primary color, coefficients for use to make the linear combination are respectively allocated to the n primary colors. Among the coefficients allocated to the color component representing the particular primary color, the coefficient allocated to the complementary primary color and the coefficients allocated to the other non-complementary primary colors have mutually opposite signs.

In another preferred embodiment, the video signal converting section produces the respective color components of the n-primary-color signal by making a linear combination of the color components of the m-primary-color signal.

In this particular preferred embodiment, in the color component representing the particular primary color, coefficients for use to make the linear combination are respectively allocated to the n primary colors. Among the coefficients allocated to the color component representing the particular primary color, the coefficient allocated to the complementary primary color and the coefficients allocated to the other non-complementary primary colors have mutually opposite signs.

In still another preferred embodiment, the display device has a pixel that is made up of multiple subpixels, and each of the multiple subpixels represents an associated one of the n primary colors.

In a specific preferred embodiment, the particular primary color is red and the primary color that is complementary to that particular primary color is cyan.

In another specific preferred embodiment, the particular primary color is green and the primary color that is complementary to that particular primary color is magenta.

In still another specific preferred embodiment, the particular primary color is blue and the primary color that is complementary to that particular primary color is yellow.

In a more specific preferred embodiment, n is equal to five and m is equal to three.

In this particular preferred embodiment, the five primary colors may be red, yellow, green, cyan and blue. And the video signal converting section may generate the five-primary-color signal such that if a color component representing the color red of the five-primary-color signal has a negative level, the color cyan that is complementary to the color red has an increased luminance and the other primary colors have decreased luminances compared to a situation where the color component representing the color red is zero.

In an alternative preferred embodiment, the five primary colors may be red, yellow, green, cyan and blue. The video signal converting section may generate the five-primary-color signal such that if a color component representing the color blue of the five-primary-color signal has a negative level, the color yellow that is complementary to the color blue has an increased luminance and the other primary colors have decreased luminances compared to a situation where the color component representing the color blue is zero.

A signal generating method according to another preferred embodiment of the present invention is a method for generating an n-primary-color signal that represents a number n of primary colors (where n is a natural number that is equal to or greater than four) in order to conduct a display operation using the n primary colors. The method includes the step of converting an m-primary-color signal received, representing a number m of primary colors (where is m is also a natural number that is smaller than n), into the n-primary-color signal. The n primary colors include a color that is complementary to a particular one of the m primary colors. And the step of converting includes generating the n-primary-color signal such that if a color component representing the particular primary color of the m-primary-color signal has a negative level, the complementary primary color has an increased luminance and the other non-complementary primary colors have decreased luminances compared to a situation where the color component representing the particular primary color is zero.

A program according to a further preferred embodiment of the present invention has been formulated to cause a computer execute the step of generating an n-primary-color signal that represents a number n of primary colors (where n is a natural number that is equal to or greater than four) in order to conduct a display operation using the n primary colors. The generating step includes the step of converting an m-primary-color signal received, representing a number m of primary colors (where is m is also a natural number that is smaller than n), into the n-primary-color signal. The n primary colors include a color that is complementary to a particular one of the m primary colors. The step of converting includes generating the n-primary-color signal such that if a color component representing the particular primary color of the m-primary-color signal has a negative level, the complementary primary color has an increased luminance and the other non-complementary primary colors have decreased luminances compared to a situation where the color component representing the particular primary color is zero.

According to various preferred embodiments of the present invention, an n-primary-color signal is generated such that if a color component representing a particular primary color of an m-primary-color signal has a negative level, a primary color that is complementary to the particular primary color has an increased luminance compared to a situation where the color component representing the particular primary color is zero, where n is a natural number that is equal to or greater than four and m is also a natural number that is smaller than n. Since the color, of which the color component has a negative level (i.e., the color outside of the color reproduction range of the m primary colors), can also be reproduced, a display operation can be conducted in a broad color reproduction range.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings. In the following description, preferred embodiments of the present invention will be described as being applied to a liquid crystal display device, for example. However, the present invention can also be used effectively in cathode-ray tubes (CRTs), organic EL display devices, plasma display panels, surface-conduction electron-emitter displays (SEDs) and various other display devices, not just liquid crystal display devices.

Figure 1:
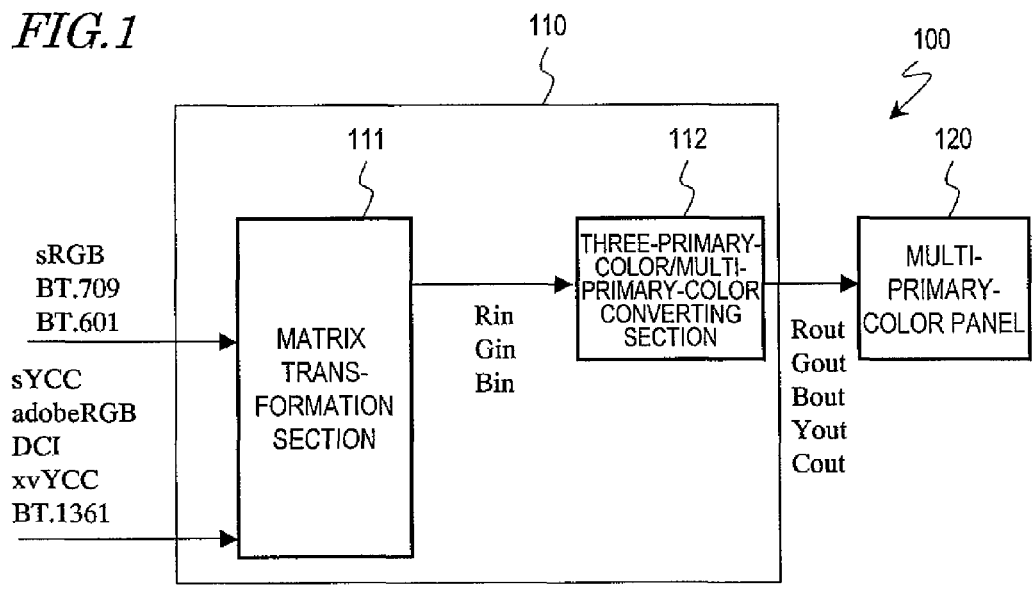
FIG. 1 shows a display device as a preferred embodiment of the present invention.

FIG. 1 shows a liquid crystal display device 100 as a preferred embodiment of the present invention. The display device 100 includes a video signal converting section 110 for converting a received video signal and generating a multi-primary-color signal and a multi-primary-color panel 120 for conducting a display operation based on the multi-primary-color signal. The video signal converting section 110 includes a matrix transformation section 111 and a three-primary-color/multi-primary-color converting section 112.

The display device 100 conducts a display operation using five primary colors. The video signal converting section 110 receives a three-primary-color signal representing the three primary colors and converts the three-primary-color signal into a five-primary-color signal representing the five primary colors.

In this example, the three primary colors represented by the three-primary-color signal (which will be simply referred to herein as the "three primary colors") are red, green and blue, while the five primary colors represented by the five-primary-color signal (which will be simply referred to herein as the "five primary colors") are red, green, blue, yellow and cyan.

In this description, the components representing the respective primary colors of the three-primary-color signal or the five-primary-color signal will be referred to herein as "color components". Each color component substantially has a luminance. In the following description of preferred embodiments, the three-primary-color signal includes red, green and blue components, while the five-primary-color signal includes red, green, blue, yellow and cyan components.

The five primary colors include a primary color that is complementary to a particular one of the three primary colors. For example, cyan is complementary to red, and yellow is complementary to blue. The color red is supposed to have a dominant wavelength of approximately 610-635 nm. The color green is supposed to have a dominant wavelength of approximately 520-550 nm. The color blue is supposed to have a dominant wavelength of approximately 470 nm or less. The color cyan that is complementary to the color red is supposed to have a dominant wavelength of approximately 475-515 nm. And the color yellow that is complementary to the color blue is supposed to have a dominant wavelength of approximately 560-585 nm. Optionally, the display device 100 may further use the color magenta (that is complementary to the color green) as another primary color. In that case, the color magenta is supposed to have a complementary wavelength of approximately 495-565 nm.

Figure 2:
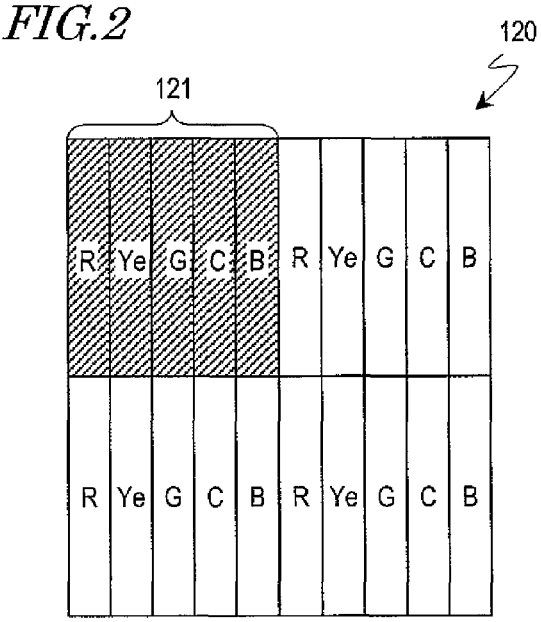
FIG. 2 illustrates four of numerous pixels of a multi-primary-color panel as a preferred embodiment of the present invention.

The multi-primary-color panel 120 has a number of pixels that are arranged in a matrix pattern. FIG. 2 illustrates four 121 of those numerous pixels of the multi-primary-color panel 120. As shown in FIG. 2, each pixel 121 is formed of multiple subpixels. More specifically, those subpixels that define each pixel 121 consist of a red subpixel R representing the color red, a green subpixel G representing the color green, a blue subpixel B representing the color blue, a yellow subpixel Ye representing the color yellow, and a cyan subpixel C representing the color cyan. In the example illustrated in FIG. 2, these five subpixels are arranged in a row and five columns within each pixel 121.

There are various formats, including currently proposed and pending ones, for the video signal to be received by the display device 100. For instance, examples of those formats include sRGB, BT. 709, BT. 601, sYCC, adobe RGB, DCI, xvYCC and BT. 1361 as shown in FIG. 1.

Among those formats shown in FIG. 1, sRGB, BT. 709 and BT. 601 are video signal formats that include only colors falling within a color reproduction range that is almost the same as the one defined by the EBU standard. When receiving a video signal in one of these formats, the display device 100 starts to perform a display operation in only the colors that fall within the color reproduction range defined by the EBU standard.

On the other hand, adobe RGB and DCI are video signal formats in which colors outside of the EBU color reproduction range can also be reproduced by setting the chromaticity coordinates of the three primary colors in a range that is broader than the EBU color reproduction range.

Meanwhile, sYCC, xvYCC and BT. 1361 are video signal formats in which colors outside of the EBU color reproduction range can also be reproduced by setting the chromaticity coordinates of the three primary colors within the EBU range but by treating negative values, too. If a video signal in one of these formats (which will also be referred to herein as a "high color range signal") has been received, the display device 100 can reproduce not just the colors inside of the EBU color reproduction range but also colors outside of the EBU range with high fidelity.

As described above, a three-primary-color signal representing a color that is outside of the color reproduction range defined by some standard such as the EBU (which will be referred to herein as a "standard range") has at least one color component with a negative level. The video signal converting section 110 generates the five-primary-color signal such that if a color component representing a particular primary color of the three-primary-color signal has a negative level, the primary color that is complementary to the particular primary color has an increased luminance compared to a situation where the color component representing the particular primary color is zero. For example, if the red component has a negative level, then the video signal converting section 110 generates the five-primary-color signal such that the color cyan that is complementary to the color red has an increased luminance but the other primary colors have decreased luminances. By performing such signal processing, even colors outside of the standard range can also be reproduced with high fidelity. Hereinafter, the reason will be described in detail with reference to FIG. 16.

Figure 16:
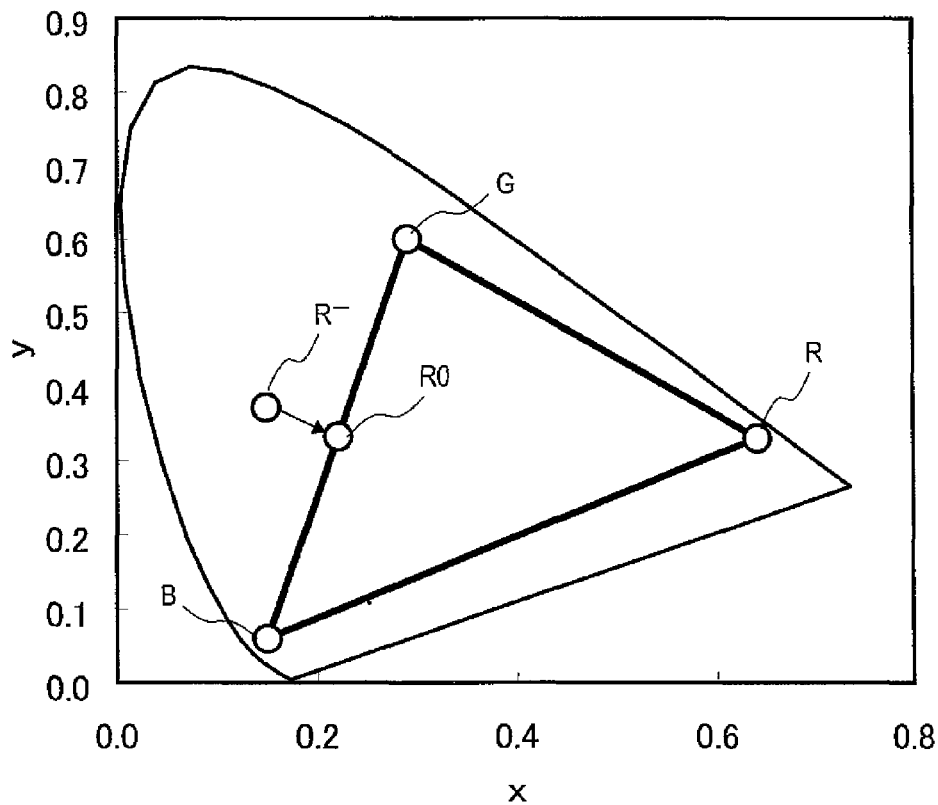
FIG. 16 indicates a color, of which the red component has a negative level.

In FIG. 16, shown are the color R− represented by a three-primary-color signal including a red component with a negative level and the color R0 represented by a three-primary-color signal including a zero red component. As shown in FIG. 16, the color R0 with the zero red component is located on the boundary of the standard range, while the color R− with the negative red component has deviated from the standard range toward the cyan range (i.e., so as to have an increase cyan chroma).

If such a three-primary-color signal with the negative red component were clipped as in the prior art (i.e., if its red component were regarded as zero), then the color reproduced on the multi-primary-color panel 120 would be no different from the color R0 represented by a three-primary-color signal with the zero red component. On the other hand, if a five-primary-color signal is generated such that the color cyan has an increased luminance compared to a situation where the red component is zero, then the color reproduced on the multi-primary-color panel 120 can be shifted such that the color cyan has an increased chroma (i.e., going up from R0 toward R−), and eventually, the color R− can be reproduced with high fidelity to the three-primary-color signal received. Also, in this case, as the red component has gone negative from zero, the overall luminance has also decreased by the magnitude of the decrease of the red component. That is why the luminances of all the other colors but cyan need to be decreased with the increase in the luminance of the color cyan taken into consideration.

As described above, the color represented by a three-primary-color signal, of which the color component of a particular one of the three primary colors has a negative level, has deviated from the standard range such that the color that is complementary to that particular primary color has an increased chroma. That is why by generating a five-primary-color signal such that the primary color that is complementary to that particular primary color has an increased luminance compared to a situation where that primary color component is zero and that all the other primary colors but the complementary primary color have decreased luminances to compensate for the increase in luminance corresponding to the negative level, the color can be reproduced with high fidelity to the three-primary-color signal received.

First of all, the video signal converting section 110 of this preferred embodiment subjects the three-primary-color signal to an isochromatic conversion, thereby generating a transient color signal (which will be referred to herein as an "isochromatic converted color signal"). As used herein, the "isochromatic conversion" means to convert a combination of color components that represent a particular color into another combination of color components without changing the colors to reproduce.

Also, the video signal converting section 110 multiplies the respective color components of the isochromatic converted color signal by a coefficient and adds the products together, thereby generating the respective color components of the five-primary-color signal. In other words, the video signal converting section 110 makes a linear combination of the respective color components of the isochromatic converted color signal to generate the respective color components of the five-primary-color signal.

Figures 3, 4:
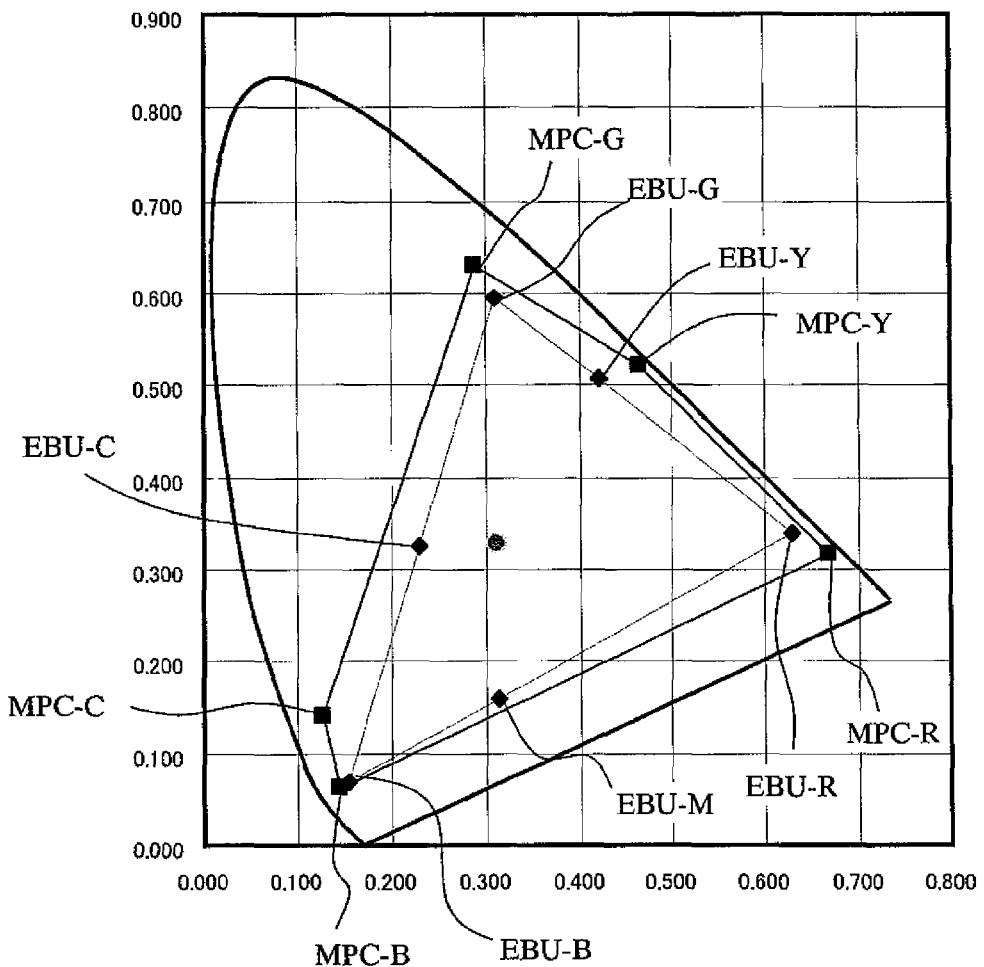
FIG. 3 is an xy chromaticity diagram according to the XYZ color system, representing the color reproduction range of the display device as a preferred embodiment of the present invention.
FIG. 4 is a table showing exemplary ratios of the luminances of the five primary colors when the colors EBU-R, EBU-G, EBU-B, EBU-Y, EBU-C, EBU-M and EBU-W need to be reproduced in a preferred embodiment of the present invention.

Hereinafter, the color reproduction range of the display device 100 that uses the five primary colors will be described with reference to FIG. 3, which is an xy chromaticity diagram according to the XYZ color system. The locations of the five primary colors used by the display device 100 are indicated on this chromaticity diagram by MPC-R, MPC-G, MPC-B, MPC-Y and MPC-C, respectively. A pentagon, of which the vertices are defined by the five points that are associated with the five primary colors of red, green, blue, yellow and cyan, represents the color reproduction range of the display device 100. On the other hand, a triangle, of which the vertices are defined by the three points that are associated with the three primary colors of red, green and blue, represents the standard range described above. This standard range is set based on a technical standard about the colors on a color TV receiver that was defined by EBU. In FIG. 3, the colors red, green, blue, yellow, cyan and magenta on the boundary of the standard range are identified by EBU-R, EBU-G, EBU-B, EBU-Y, EBU-C and EBU-M, respectively. The color reproduction range of the five primary colors surrounds the standard range. And the display device 100 can reproduce even colors outside of the standard range with high fidelity.

The liquid crystal display device 100 conducts a color display operation using the five primary colors. Therefore, when a pixel represents a certain color, the five subpixels thereof should naturally be lit with predetermined luminances. FIG. 4 is a table showing exemplary ratios of the luminances of the five primary colors when the colors EBU-R, EBU-G, EBU-B, EBU-Y, EBU-C, EBU-M and EBU-W (where EBU-W represents the color white) need to be reproduced. In this example, each of these colors EBU-R, EBU-G, EBU-B, EBU-Y, EBU-C, and EBU-M is basically represented by three of the five primary colors that are located closest to that color. For example, EBU-R is represented by a combination of MPC-R with a luminance of 1.015, MPC-B with a luminance of 0.010 and MPC-Y with a luminance of 0.094. The ratio of the luminances that have been determined in advance in this manner will be a coefficient to be used when the respective color components of the five-primary-color signal are generated by making a linear combination as will be described later.

Next, it will be described how the image capture device generates a video signal.

The image capture device (not shown) receives light representing the color of a subject (which is represented by the three stimulus values (X, Y, Z) in the XYZ color system), and subjects it to a color space conversion, thereby generating signals $L_R$, $L_G$ and $L_B$. According to the xvYCC standard, the color space conversion may be represented by the following Equation (1):

$$\begin{pmatrix} L_R \\ L_G \\ L_B \end{pmatrix} = \begin{pmatrix} 3.240 & -1.537 & -0.499 \\ -0.969 & 1.876 & 0.042 \\ 0.056 & -0.204 & 1.057 \end{pmatrix} \begin{pmatrix} X \\ Y \\ Z \end{pmatrix} \quad (1)$$

Next, the image capture device performs a photoelectric conversion (i.e., inverse gamma transform) represented by the following Equations (2), thereby generating signals $E_R$, $E_G$ and $E_B$ based on the signals $L_R$, $L_G$ and $L_B$, respectively:

$E = 1.099 L^{0.45} - 0.099$ for $L \geq 0.018$ $E = 4.500 L$ for $0.018 > L > -0.018$ $E = -1.099(-L)^{0.45} + 0.099$ for $-0.018 \geq L$ (2)

Optionally, by calculating the signal E in a situation where $-0.018 \geq L$, a color component with a negative level can be included in the video signal.

Subsequently, the image capture device carries out a color signal conversion represented by the following Equations (3), thereby generating signals $E_Y$, $E_{Cb}$ and $E_{Cr}$ based on the signals $E_R$, $E_G$ and $E_B$, respectively:

$E_Y = 0.2126 E_R + 0.7152 E_G + 0.0722 E_B$ $E_{Cb} = -0.1146 E_R - 0.3854 E_G + 0.5000 E_B$ $E_{Cr} = 0.5000 E_R - 0.4542 E_G - 0.458 E_B$ (3)

Thereafter, quantization represented by the following Equations (4) is carried out, thereby generating a luminance signal $_{255}Y$ and chrominance signals $_{255}Cb$ and $_{255}Cr$:

$_{255}Y = 219 E_Y + 16 \quad 16 \leq {_{255}Y} \leq 235$ $_{255}Cb = 224 E_{Cb} + 128 \quad 1 \leq {_{255}Cb} \leq 254$ $_{255}Cr = 224 E_{Cr} + 128 \quad 1 \leq {_{255}Cr} \leq 254$ (4)

The luminance signal $_{255}Y$ and chrominance signals $_{255}Cb$ and $_{255}Cr$ thus generated may be transmitted as a video signal, for example, which is then received at the display device.

Hereinafter, it will be described how the display device performs its video signal processing.

The matrix transformation section 111 of the display device 100 performs the color signal conversion represented by the following Equation (5), thereby converting the luminance signal $_{255}Y$ and chrominance signals $_{255}Cb$ and $_{255}Cr$ received into an RGB signal $_{255}R$, $_{255}G$ and $_{255}B$.

$$\begin{pmatrix} _{255}R \\ _{255}G \\ _{255}B \end{pmatrix} = \frac{1}{256} \begin{pmatrix} 298.082 & 0 & 458.942 \\ 298.082 & -54.592 & -136.425 \\ 298.082 & 540.775 & 0 \end{pmatrix} \begin{pmatrix} Y - 16 \\ Cb - 128 \\ Cr - 128 \end{pmatrix} \quad (5)$$

Figure 5:
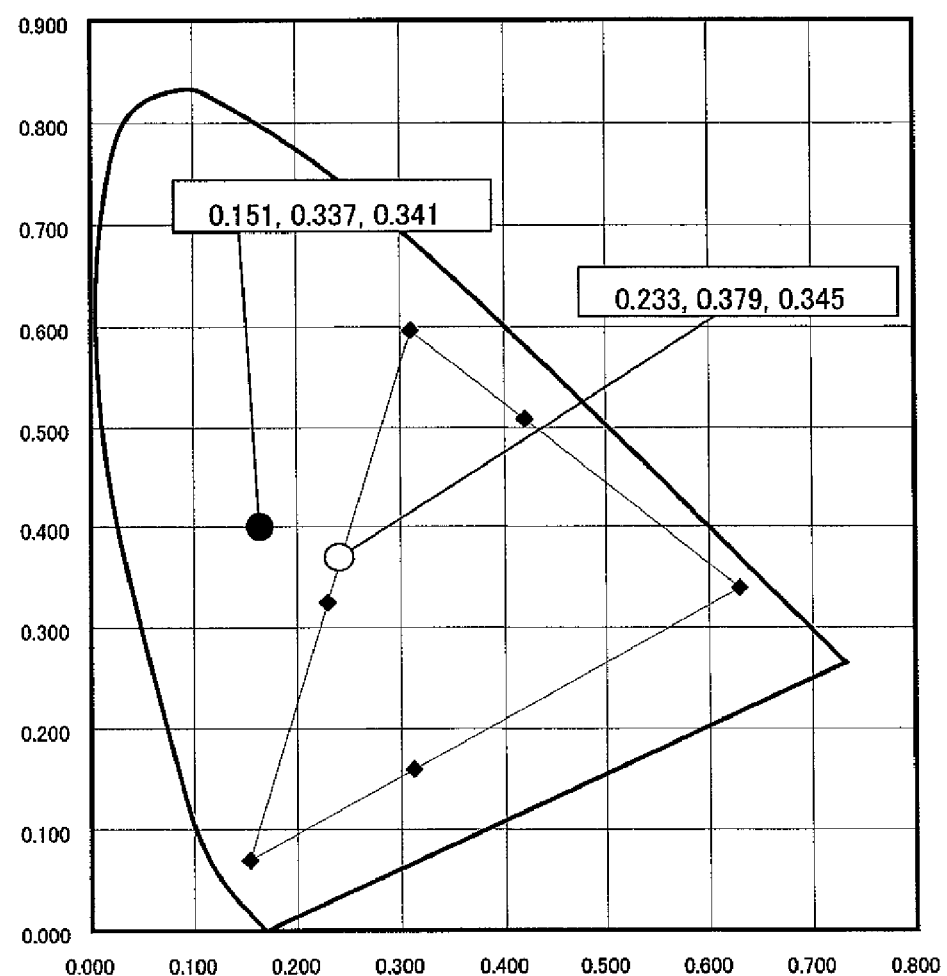
FIG. 5 is an xy chromaticity diagram according to the XYZ color system, indicating a color of which the color component has a negative level in a preferred embodiment of the present invention.

Now look at the chromaticity diagram shown in FIG. 5. If the actual color of the subject is represented by the coordinates (X, Y, Z)=(0.233, 0.379, 0.345), that color is located on the boundary of the standard range. In that case, the RGB signal calculated by Equation (5) becomes ($_{255}R$, $_{255}G$, $_{255}B$)= (0, 180, 138) and none of their color components have a negative level. That is why the RGB signal can be displayed as it is.

However, if the actual color of the subject is outside of the standard range, e.g., if it is represented by the coordinates (X, Y, Z)=(0.151, 0.337, 0.341), the RGB signal calculated by Equation (5) becomes ($_{255}R$, $_{255}G$, $_{255}B$)=(-111, 180, 138) and the red component thereof has a negative level. That is why the RGB signal cannot be displayed as it is, thus requiring signal processing to reproduce this color with fidelity.

Hereinafter, it will be described with reference to FIGS. 6 and 7 how to get such signal processing done to reproduce the color of RGB signal, including a color component with a negative level, with high fidelity.

Figure 6:
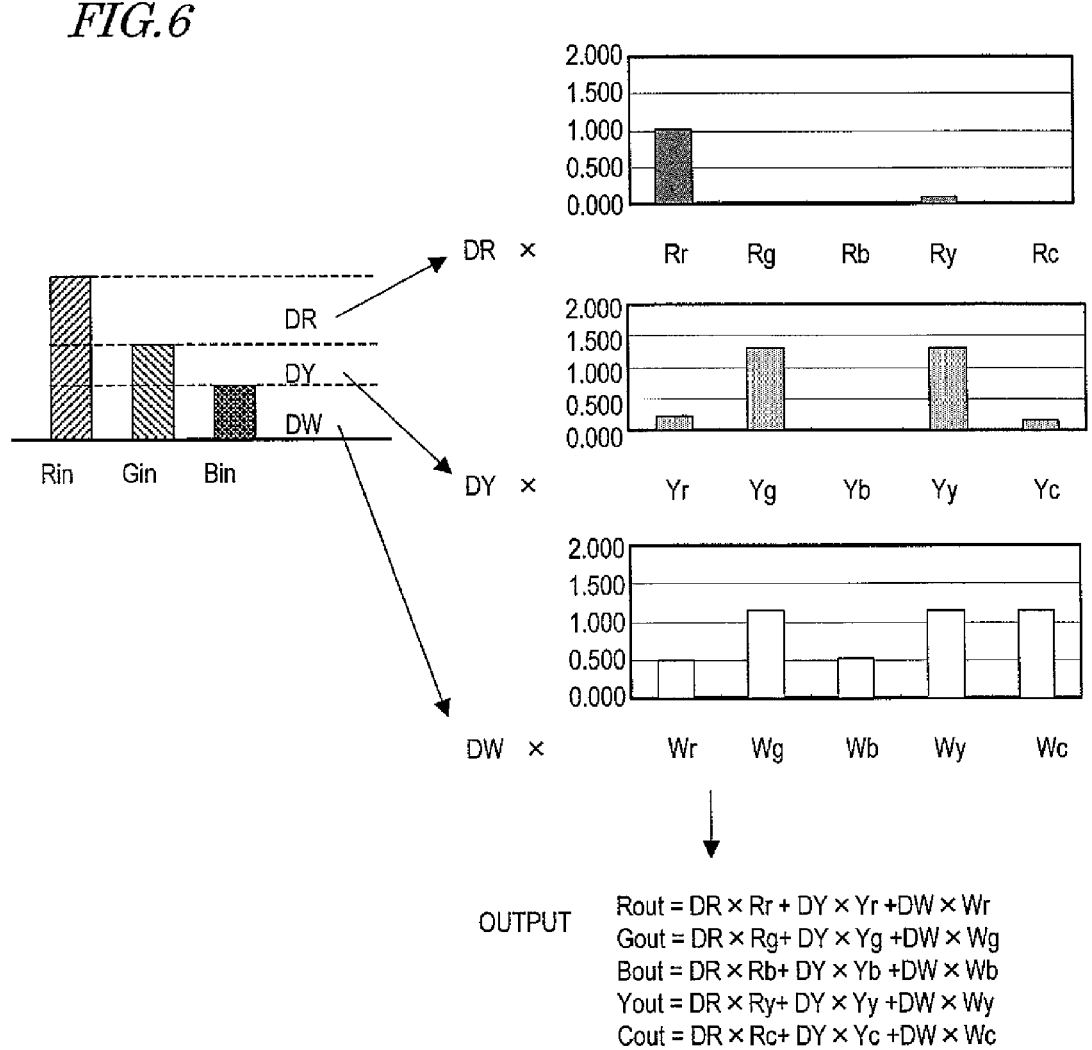
FIG. 6 illustrates signal processing to carry out in a situation where the RGB signal includes no color component with a negative level in a preferred embodiment of the present invention.
Figure 7:
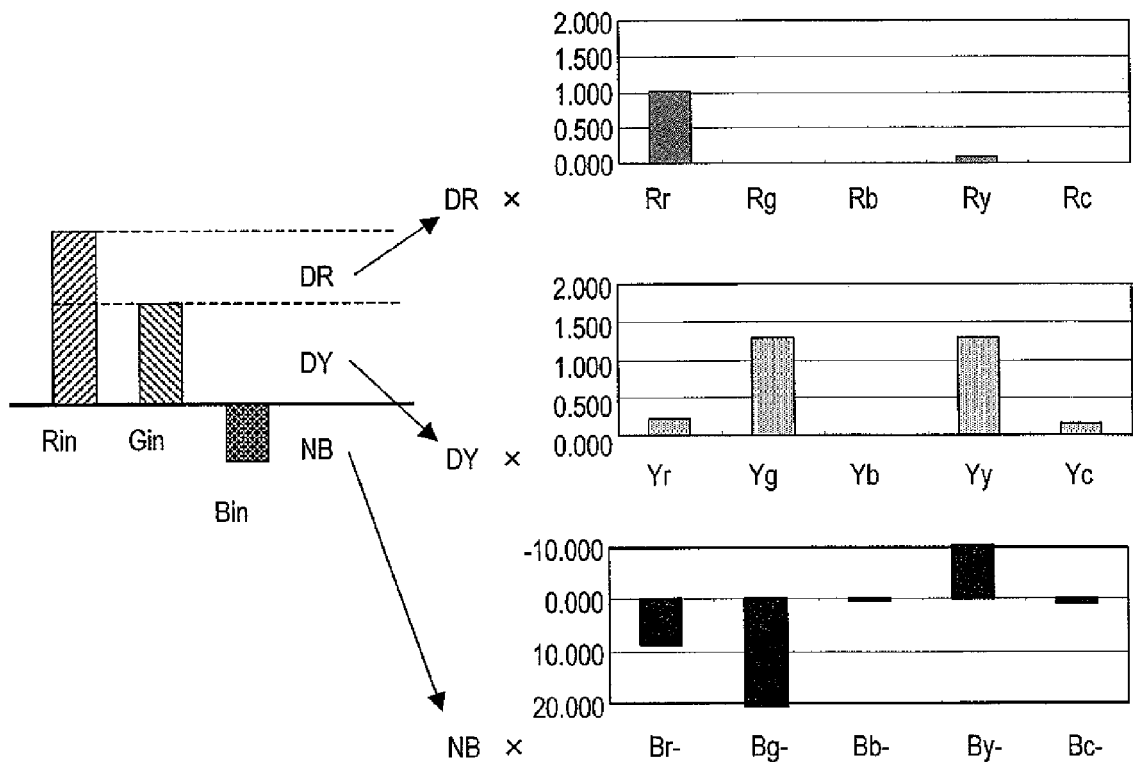
FIG. 7 illustrates signal processing to carry out in a situation where the RGB signal includes a color component with a negative level in a preferred embodiment of the present invention.

FIG. 6 illustrates signal processing to carry out in a situation where the RGB signal includes no color component with a negative level. On the other hand, FIG. 7 illustrates signal processing to carry out in a situation where the RGB signal includes a color component with a negative level.

First, it will be described with reference to FIG. 6 what type of processing needs to be done to generate a five-primary-color signal in a situation where the RGB signal includes no color components with a negative level.

The RGB signal $R_{in}$, $G_{in}$, $B_{in}$ is supplied from the matrix transformation section 111 (see FIG. 1) to the three-primary-color/multi-primary-color converting section 112. The bar graphs shown on the left-hand side of FIG. 6 represent the respective levels of the red, green and blue components $R_{in}$, $G_{in}$ and $B_{in}$ included in the RGB signal (and representing the luminances of the colors red, green and blue, respectively). The three-primary-color/multi-primary-color converting section 112 carries out an isochromatic conversion on the RGB signal $R_{in}$, $G_{in}$, $B_{in}$, thereby generating an isochromatic converted color signal including white, yellow, and red components DW, DY and DR.

As can be seen from FIG. 6, the level of the blue component $B_{in}$, which is the lowest among the red, green and blue components $R_{in}$, $G_{in}$ and $B_{in}$ of the RGB signal, sets the level of the white component DW of the isochromatic converted color signal. Meanwhile, the difference between the level of the green component $G_{in}$, which is the second lowest, and that of the blue component $B_{in}$ defines the level of the yellow component DY of the isochromatic converted color signal, while the difference between the level of the red component $R_{in}$, which is the highest, and that of the green component $G_{in}$ defines the level of the red component of the isochromatic converted color signal. In this example, an isochromatic converted color signal, including white, yellow and red components DW, DY and DR, is supposed to be generated. However, the isochromatic converted color signal does not have to include these types of color components alone. Rather, the isochromatic converted color signal may include any combination of the seven types of color components—the red, green and blue components DR, DG and DB representing the three primary colors, the cyan, magenta and yellow components DC, DM and DY representing their complementary colors, and the white component DW that is an achromatic component—according to the level relationship between the red, green and blue components $R_{in}$, $G_{in}$ and $B_{in}$ of the input RGB signal.

The three-primary-color/multi-primary-color converting section 112 makes a linear combination of these color components DW, DY and DR of the isochromatic converted color signal, thereby generating the respective color components $R_{out}$, $G_{out}$, $B_{out}$, $Y_{out}$ and $C_{out}$ of the five-primary-color signal. To each of these color components DW, DY and DR of the isochromatic converted color signal, coefficients Wr through Wc, Yr through Yc or Rr through Rc, which will be used to make a linear combination of the five primary colors for use in display, have been allocated in advance. As used herein, the coefficients for use to make a linear combination represent the ratio of the respective luminances of the five primary colors that are allocated to the each color component of the isochromatic converted color signal. For example, Rr through Rc represent the ratio of the respective luminances that the red, green, blue, yellow, and cyan subpixels should have for the red component DR. Specifically, (Rr, Rg, Rb, Ry, Rc)= (1.015, 0.000, 0.010, 0.094, 0.000). The respective color components $R_{out}$ through $C_{out}$ of the five-primary-color signal are determined by multiplying the white, yellow and red components DW, DY and DR of the isochromatic converted color signal by these coefficients and adding the resultant products together (i.e., by making a linear combination) as in the following Equations (6):

$$R_{out}=DR \times Rr+DY \times Yr+DW \times Wr$$

$$G_{out}=DR \times Rg+DY \times Yg+DW \times Wg$$

$$B_{out}=DR \times Rb+DY \times Yb+DW \times Wb$$

$$Y_{out}=DR \times Ry+DY \times Yy+DW \times Wy$$

$$C_{out}=DR \times Rc+DY \times Yc+DW \times Wc \quad (6)$$

In this manner, the three-primary-color/multi-primary-color converting section 112 generates a five-primary-color signal, including these color components $R_{out}$ through $C_{out}$ respectively representing the five primary colors, and outputs it to the multi-primary-color panel 120. In response, the multi-primary-color panel 120 presents colors just as represented by the five-primary-color signal received.

Figure 8:
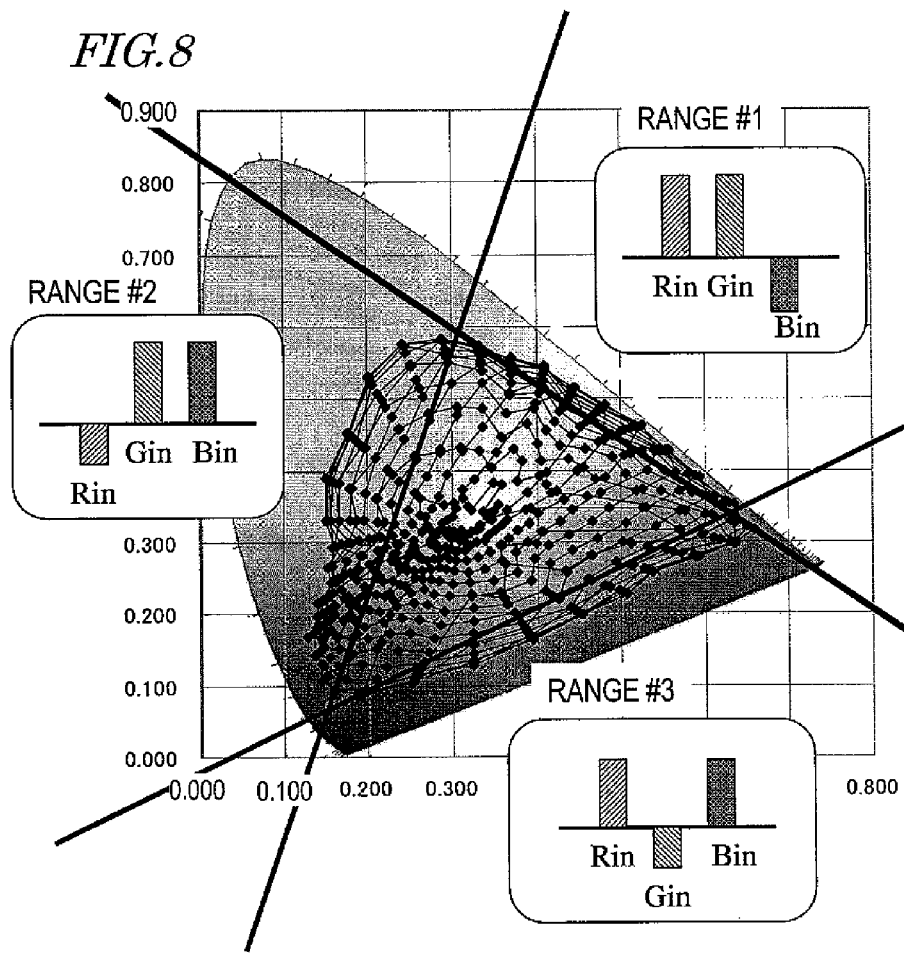
FIG. 8 shows a relation between a color, of which the red, green, or blue component has a negative level, and the Pointer's colors in a preferred embodiment of the present invention.

Next, it will be described with reference to FIG. 7 what type of processing needs to be done to generate a five-primary-color signal in a situation where the RGB signal includes a color component with a negative level. In the example shown in FIG. 7, the blue component $B_{in}$ has a negative level. Such a color including a blue component $B_{in}$ with a negative level belongs to the range #1 shown in FIG. 8, which shows a relation between a color, of which the red, green, or blue component $R_{in}$, $G_{in}$ or $B_{in}$ has a negative level, and the Pointer's colors. Those ranges #1 to #3 are defined outside of the standard range. Specifically, a color, of which the blue component $B_{in}$ has a negative level, belongs to the range #1. A color, of which the red component $R_{in}$ has a negative level, belongs to the range #2. And a color, of which the green component $G_{in}$ has a negative level, belongs to the range #3.

If the five-primary-color signal is generated such that when the blue component Bin has a negative level, the color yellow that is complementary to the color blue has an increased luminance, the color belonging to the range #1 can be presented.

Now look at FIG. 7 again. The bar graphs shown on the left-hand side of FIG. 7 represent the respective levels of the red, green and blue components $R_{in}$, $G_{in}$ and $B_{in}$ included in the RGB signal (and representing the luminances of the colors red, green and blue, respectively). The blue component $B_{in}$ has a negative level. The three-primary-color/multi-primary-color converting section 112 carries out an isochromatic conversion on the RGB signal $R_{in}$, $G_{in}$, $B_{in}$, thereby generating an isochromatic converted color signal including blue, yellow, and red components NB, DY and DR. The procedure of the isochromatic conversion is just as already described with reference to FIG. 6. Since the negative level of the blue component $B_{in}$ of the RGB signal is used as the blue component NB of the isochromatic converted color signal as it is, that blue component NB also has a negative level.

The three-primary-color/multi-primary-color converting section 112 makes a linear combination of these color components NB, DY and DR of the isochromatic converted color signal, thereby generating the respective color components $R_{out}$, $G_{out}$, $B_{out}$, $Y_{out}$ and $C_{out}$ of the five-primary-color signal. To each of these color components NB, DY and DR of the isochromatic converted color signal, coefficients Br– through Bc–, Yr through Yc or Rr through Rc, which will be used to make a linear combination of the five primary colors for use in display, have been allocated in advance. Among these coefficients Br–through Bc–that are allocated to the blue component NB of the isochromatic converted color signal, the coefficient By– for the color yellow that is the complementary primary color of blue and the coefficients Br–, Bg–, Bb– and Bc– for all the other primary colors but yellow have mutually opposite signs.

The respective color components $R_{out}$ through $C_{out}$ of the five-primary-color signal are determined by making the linear combination represented by the following Equations (7):

$$R_{out}=DR \times Rr+DY \times Yr+NB \times Br-$$

$$G_{out}=DR \times Rg+DY \times Yg+NB \times Bg-$$

$$B_{out}=DR \times Rb+DY \times Yb+NB \times Bb-$$

$$Y_{out}=DR \times Ry+DY \times Yy+NB \times By-$$

$$C_{out}=DR \times Rc+DY \times Yc+NB \times Bc- \quad (7)$$

According to Equations (7), the product of the red component DR and its associated coefficient (such as DR×Rr or DR×Rg), the product of the yellow component DY and its associated coefficient (such as DY×Yr or DY×Yg), and the product of the blue component NB and its associated coefficient (such as NB×Br–or NB×Bg–) are added together. In the combination of coefficients associated with the blue component NB, only the coefficient By–has a negative value but the coefficients associated with the other primary colors have positive values. Since (a negative value)×(a negative value)= (a positive value), the level of the yellow component $Y_{out}$ of the five-primary-color signal increases by NB×By–. As a result, a five-primary-color signal, of which the luminance of yellow that is the complementary color of blue has increased compared to a situation where the blue component $B_{in}$ is zero, can be generated. By increasing the luminance of yellow, the colors belonging to the range #1 shown in FIG. 8 can be reproduced with high fidelity. Also, since the blue component NB has a negative value in Equations (7), the luminances of all the other primary colors but yellow decrease by NB×By−. Consequently, a five-primary-color signal, of which the luminances of all the other primary colors but yellow have decreased compared to a situation where the blue component $B_{in}$ is zero, can be generated. By decreasing the luminances of all of those primary colors other than yellow, the colors belonging to the range #1 shown in FIG. 8 can be reproduced with even higher fidelity.

Figure 9:
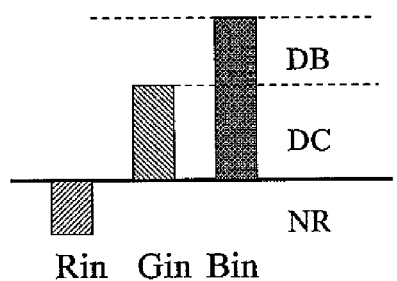
FIG. 9 shows an RGB signal, of which the red component has a negative level, in a preferred embodiment of the present invention.

In the example that has just been described with reference to FIG. 7, the blue component $B_{in}$ is supposed to have a negative level. As shown in FIG. 9, however, even if the red component $R_{in}$ has a negative level, a five-primary-color signal is also generated such that cyan that is the complementary color of red has an increased luminance but that all the other primary colors except for cyan have decreased luminances. FIG. 9 shows an RGB signal of which the red component $R_{in}$ has a negative level.

Figure 10:
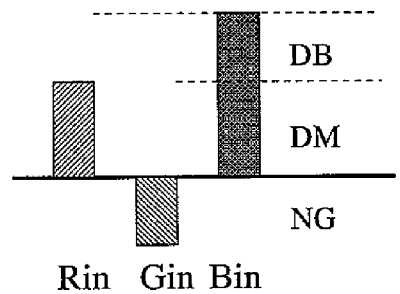
FIG. 10 shows an RGB signal, of which the green component has a negative level, in a preferred embodiment of the present invention.

Furthermore, FIG. 10 shows an RGB signal of which the green component $G_{in}$ has a negative level. The present invention cannot be applied to a situation where only the five primary colors without magenta are used. However, if magenta is included in the primary colors as in a display device that uses six primary colors, then a five-primary-color signal may be generated such that magenta that is the complementary color of green has an increased luminance but that all the other primary colors but magenta have decreased luminances.

Hereinafter, it will be described with reference to FIGS. 11 and 12 how those coefficients for use to make the linear combination described above may be calculated.

Among color components included in an isochromatic converted color signal, coefficients for the color components with positive levels may be calculated just as already described with reference to FIG. 4. On the other hand, coefficients for the color component with a negative level may be calculated in the following manner.

Figure 11:
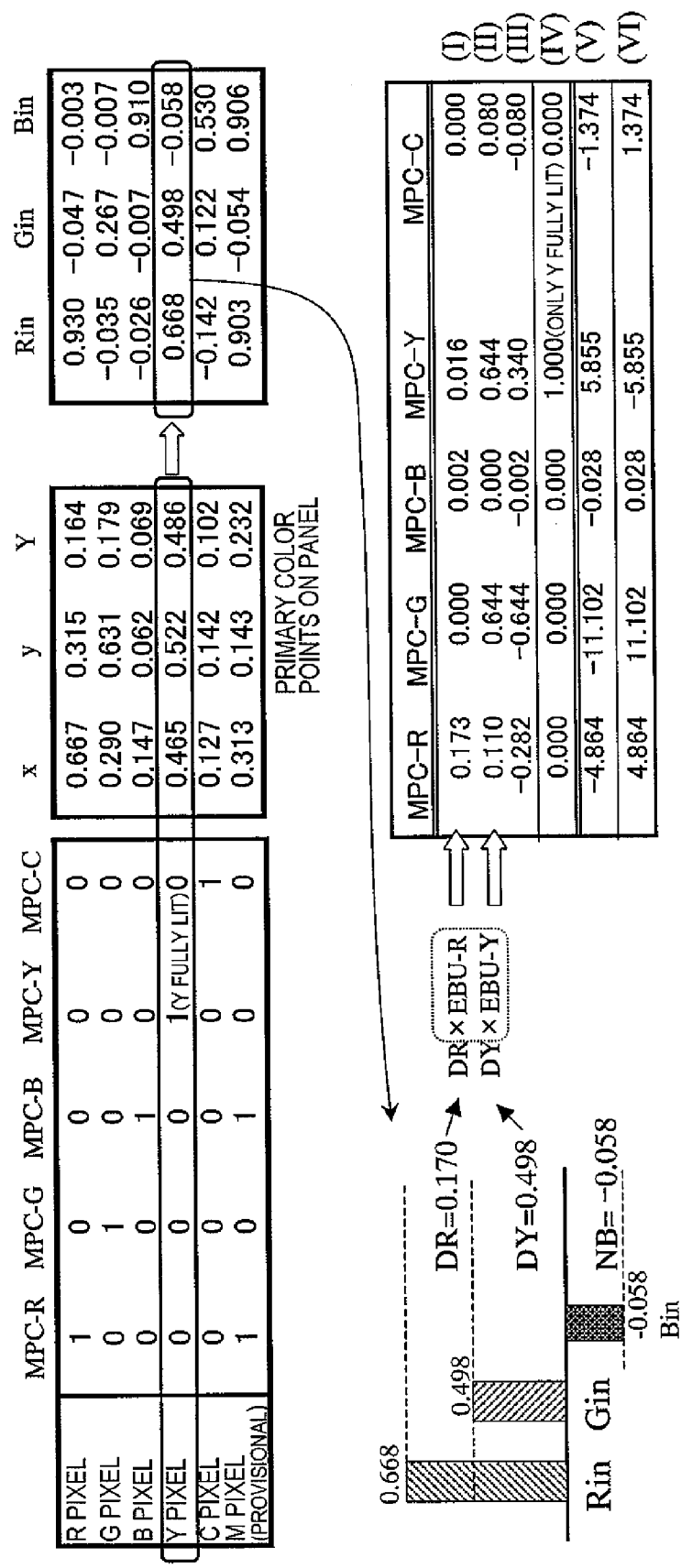
FIG. 11 shows how to calculate coefficients for an isochromatic converted color signal in a preferred embodiment of the present invention.

FIG. 11 shows how to calculate coefficients for a blue component NB with a negative level. If only a yellow subpixel, representing yellow that is the complementary color of blue, is lit with the luminance associated with the highest grayscale (which will be referred to herein as "fully lit"), then the chromaticity values x and y and the lightness Y of the reproduced color yellow MPC-Y are:

$$x=0.465$$

$$y=0.522$$

$$Y=0.486 \tag{8}$$

respectively. And the respective color components $R_{in}$, $G_{in}$ and $B_{in}$ of an RGB signal representing the color yellow with such chromaticity values x and y and lightness Y are supposed to have the following levels:

$$R_{in}=0.668$$

$$G_{in}=0.498$$

$$B_{in}=-0.058 \tag{9}$$

respectively. If the respective color components $R_{in}$, $G_{in}$ and $B_{in}$ of the RGB signal have such levels, then the red, yellow and blue components DR, DY and NB of the isochromatic converted color signal respectively have the following levels:

$$DR=0.170$$

$$DY=0.498$$

$$NB=-0.058 \tag{10}$$

By multiplying together the level of the red component DR and the coefficients allocated to that red component DR (e.g., the coefficients shown on the EBU-R row of FIG. 4), the luminances of the five primary colors MPC-R through MPC-C to reproduce the red component DR can be obtained as shown on the row (I) of FIG. 11.

In the same way, by multiplying together the level of the yellow component DY and the coefficients allocated to that yellow component DY (e.g., the coefficients shown on the EBU-Y row of FIG. 4), the luminances of the five primary colors MPC-R through MPC-C to reproduce the yellow component DY can be obtained as shown on the row (II) of FIG. 11.

The luminances of the five primary colors MPC-R through MPC-C in a situation where only the yellow subpixel is fully lit are shown on the row (IV) of FIG. 11. In this case, the sum of the luminances of the five primary colors MPC-R through MPC-C to reproduce the red component DR, those of the five primary colors MPC-R through MPC-C to reproduce the yellow component DY, and those of the five primary colors MPC-R through MPC-C to reproduce the blue component NB corresponds to the luminances of the five primary colors MPC-R through MPC-C when only the yellow subpixel is fully lit. That is why by subtracting the luminances shown on the rows (I) and (II) from the ones shown on this row (IV), the luminances of the five primary colors MPC-R through MPC-C to reproduce the blue component NB can be obtained as shown on the row (III) of FIG. 11. That is to say, (III)=(IV)−((I)+(II)) is satisfied.

The luminances shown on the row (III) correspond to the luminances when the blue component NB has a level of −0.058. That is why by dividing the luminances shown on the row (III) by 0.058, the luminances in a situation where the blue component NB has a level of −1 (i.e., reference values) can be obtained as shown on the row (V). The ratio of the luminances shown on the row (V) is nothing but the ratio of the five primary colors to reproduce the color blue with a negative grayscale. It can be seen from the values shown on (V) that as the absolute value of the level of the blue component NB increases, the luminance of yellow that is the complementary color of blue increases but the luminances of the other primary colors decrease. As the level of the blue component NB when the linear combination is made has a negative sign, the values shown on the row (VI) obtained by inverting the signs of the values shown on (V) may be used as coefficients for the blue component NB with a negative level. In this manner, coefficients (i.e., coefficients to make a linear combination) can be obtained for the blue component NB with a negative level.

In the example described above, based on the chromaticity and lightness values when only the yellow subpixel is fully lit, the levels of the respective color components of the incoming RGB signal are estimated and the coefficients for the blue component NB are calculated backward. Alternatively, the coefficients for the blue component NB may also be calculated back based on the chromaticity and lightness values of any other color to be reproduced in a differently lit state.

It should be noted that the coefficients for use when the red component has a negative level could be obtained in a similar manner based on the luminances when only the cyan subpixel is fully lit.

Optionally, the five-primary-color signal may also be generated by making a linear combination of the color components of the RGB signal instead of performing the isochromatic conversion. Hereinafter, it will be described with reference to FIG. 12 how coefficients for use to make such a linear combination may be calculated. FIG. 12 shows how to calculate coefficients for the blue component NB with a negative level.

To each of the three color components $R_{in}$, $G_{in}$ and $B_{in}$ of the RGB signal, allocated in advance are the coefficients Rr through Rc, Gr through Gc or Br–through Bc– for use to make a linear combination. The respective color components $R_{out}$, $G_{out}$, $B_{out}$, $Y_{out}$ and $C_{out}$ are determined by making a linear combination as represented by the following Equations (11):

$$R_{out}=R_{in}\times Rr+G_{in}\times Gr+NB\times Br-$$

$$G_{out}=R_{in}\times Rg+G_{in}\times Gg+NB\times Bg-$$

$$B_{out}=R_{in}\times Rb+G_{in}\times Gb+NB\times Bb-$$

$$Y_{out}=R_{in}\times Ry+G_{in}\times Gy+NB\times By-$$

$$C_{out}=R_{in}\times Rc+G_{in}\times Gc+NB\times Bc- \quad (11)$$

Figure 12:
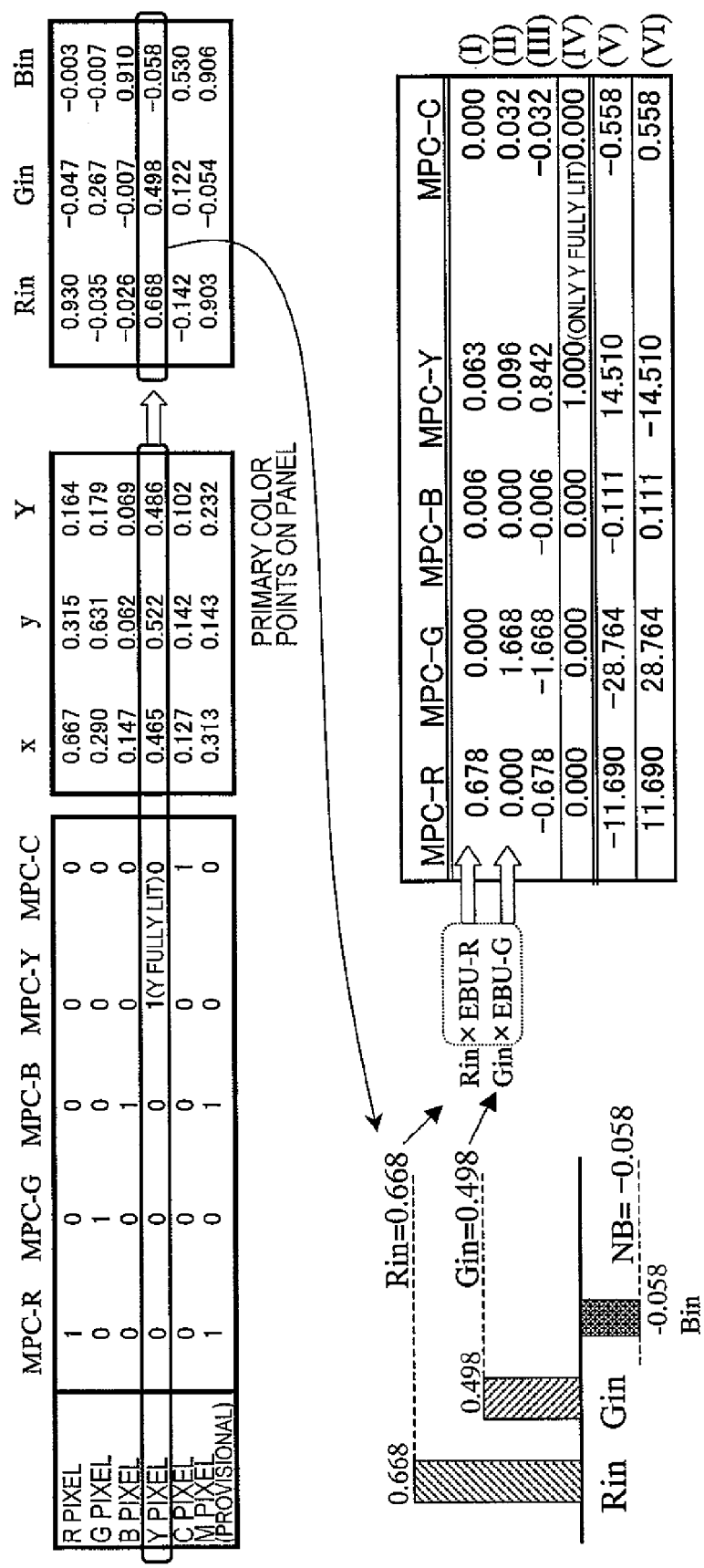
FIG. 12 shows how to calculate coefficients for a color signal, of which a color component has a negative level, in a preferred embodiment of the present invention.
Figure 13:
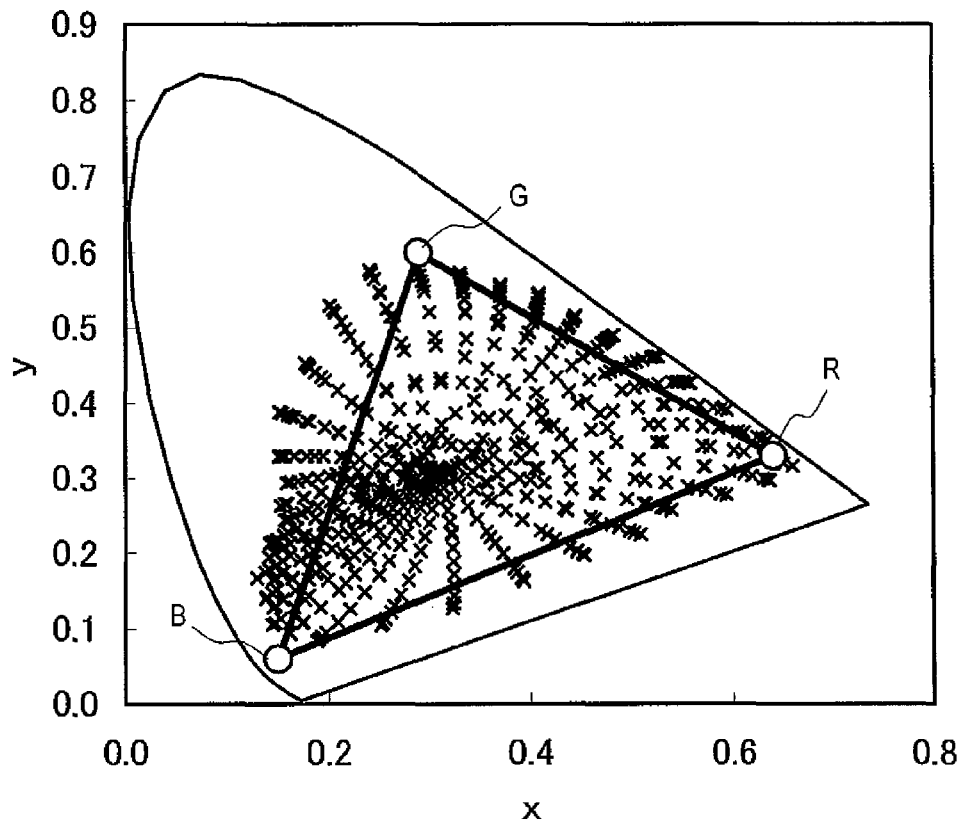
FIG. 13 shows an xy chromaticity diagram according to the XYZ color system, in which the triangle, formed by the three points corresponding to the three primary colors of red, green and blue, represents the color reproduction range.
Figure 14:
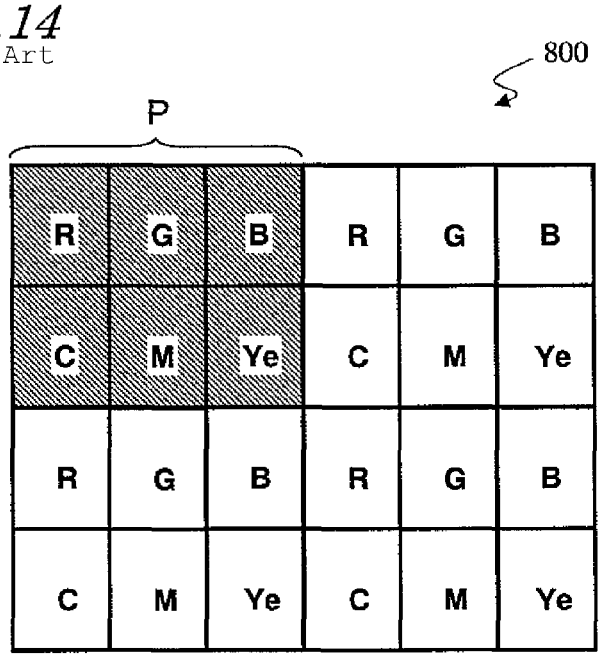
FIG. 14 shows a liquid crystal display device in which one pixel P consists of six subpixels R, G, B, Ye, C and M representing the colors red, green, blue, yellow, cyan and magenta, respectively.
Figure 15:
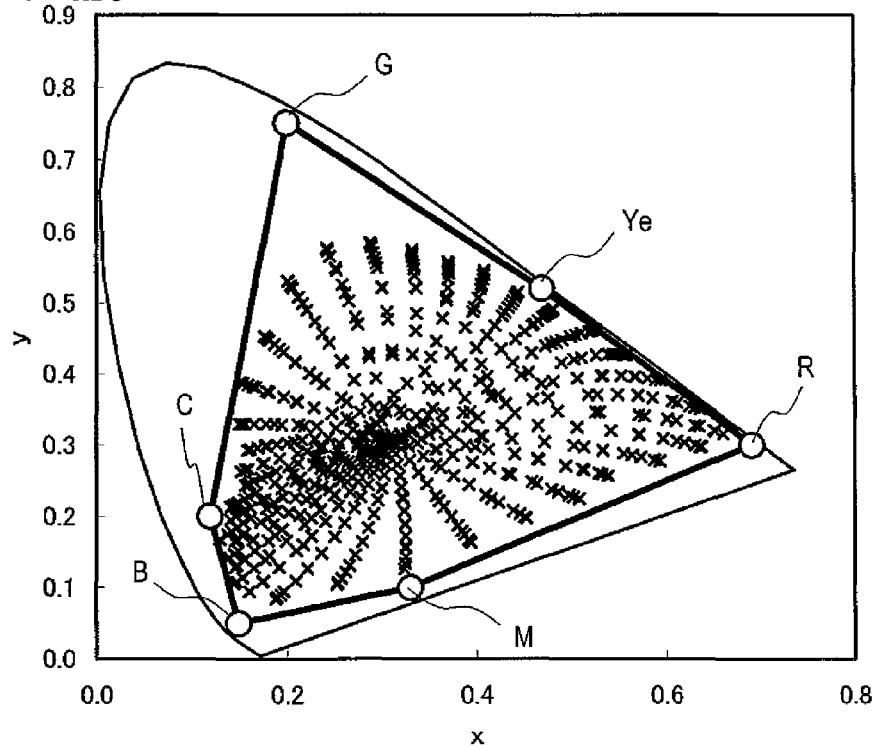
FIG. 15 shows the color reproduction range of the liquid crystal display device shown in FIG. 14.

As can be seen from FIG. 12, the levels of the respective color components of the RGB signal are derived to be:

$$R_{in}=0.668$$

$$G_{in}=0.498$$

$$B_{in}=-0.058 \quad (12)$$

respectively, which is no different from the method shown in FIG. 11 up to this point. According to the method shown in FIG. 12, however, the level of the red component $R_{in}$ and the coefficients allocated to that red component $R_{in}$ (e.g., the coefficients shown on the EBU-R row of FIG. 4) are multiplied together next, thereby obtaining the luminances of the five primary colors MPC-R through MPC-C to reproduce the red component $R_{in}$ as shown on the row (I) of FIG. 12.

In the same way, the level of the green component $G_{in}$ and the coefficients allocated to that green component $G_{in}$ (e.g., the coefficients shown on the EBU-G row of FIG. 4) are multiplied together, thereby obtaining the luminances of the five primary colors MPC-R through MPC-C to reproduce the green component $G_{in}$ as shown on the row (II) of FIG. 12.

The luminances of the five primary colors MPC-R through MPC-C in a situation where only the yellow subpixel is fully lit are shown on the row (IV) of FIG. 12. In this case, the sum of the luminances of the five primary colors MPC-R through MPC-C to reproduce the red component $R_{in}$, those of the five primary colors MPC-R through MPC-C to reproduce the green component $G_{in}$, and those of the five primary colors MPC-R through MPC-C to reproduce the blue component NB corresponds to the luminances of the five primary colors MPC-R through MPC-C when only the yellow subpixel is fully lit. That is why by subtracting the luminances shown on the rows (I) and (II) from the ones shown on this row (IV), the luminances of the five primary colors MPC-R through MPC-C to reproduce the blue component NB can be obtained as shown on the row (III) of FIG. 12. That is to say, (III)= (IV)−((I)+(II)) is satisfied.

The luminances shown on the row (III) correspond to the luminances when the blue component NB has a level of −0.058. That is why by dividing the luminances shown on the row (III) by 0.058, the luminances in a situation where the blue component NB has a level of −1 (i.e., reference values) can be obtained as shown on the row (V). The ratio of the luminances shown on the row (V) is nothing but the ratio of the five primary colors to reproduce the color blue with a negative grayscale. It can be seen from the values shown on (V) that as the absolute value of the level of the blue component NB increases, the luminance of yellow that is the complementary color of blue increases but the luminances of the other primary colors decrease. As the level of the blue component NB when the linear combination is made has a negative sign, the values shown on the row (VI) obtained by inverting the signs of the values shown on (V) may be used as coefficients for the blue component NB with a negative level. In this manner, coefficients (i.e., coefficients to make a linear combination) can be obtained for the blue component NB with a negative level.

In the example described above, based on the chromaticity and lightness values when only the yellow subpixel is fully lit, the levels of the respective color components of the incoming RGB signal are estimated and the coefficients for the blue component NB are calculated backward. Alternatively, the coefficients for the blue component NB may also be calculated back based on the chromaticity and lightness values of any other color to be reproduced in a differently lit state.

As can be seen from FIGS. 11 and 12, although the NB coefficient value may vary according to the calculating method, the color yellow that is complementary to the color blue also has negative values and all the other primary colors except for that complementary color also have positive values.

That is to say, looking from a different viewpoint, it can be seen that various preferred embodiments of the present invention provide a methods and apparatuses to compensate for both an increase in the chroma of a complementary color and a decrease in the overall luminance when a signal representing a particular primary color goes negative from zero by increasing the luminance of the complementary primary color and decreasing the luminances of the other primary colors. That is why as long as such a signal can be generated, it is not always necessary to adopt the calculating method of the preferred embodiment described above.

Optionally, the five-primary-color signal thus generated may be subjected to a gamma correction and then input to the multi-primary-color panel 120.

In the preferred embodiments described above, the present invention is preferably applied to a display device that conducts a display operation by converting a three-primary-color signal into a five-primary-color signal. However, the present invention is in no way limited to those specific preferred embodiments but any other number of primary colors may be adopted as well. Speaking more generally, the present invention is applicable to a display device that conducts a display operation by receiving an m-primary-color signal representing a number m of primary colors (where m is a natural number that is smaller than n) and converting the m-primary-color signal into an n-primary-color signal representing a number n of primary colors (where n is a natural number that is equal to or greater than four). For example, preferred embodiments of the present invention are also applicable to a display device that conducts a display operation by converting a three-primary-color signal into a six-primary-color signal.

Optionally, preferred embodiments of the present invention are also applicable to a field sequential driving display device.

It should be noted that the respective elements that form the display device 100 described above could be implemented as hardware components but could also be implemented by software programs either partially or even entirely.

If those elements are implemented by software, a computer may be used as needed. In that case, the computer may include a CPU (central processing unit) for executing those various programs and a RAM (random access memory) functioning as a work area to execute those programs. And by providing those programs that perform the functions of the respective elements as a result of being executed by the computer, those elements are implemented by the computer itself, so to speak.

Also, those programs may be either installed into the computer by way of a storage medium or downloaded into the computer over a telecommunications network.

In the former case, the storage medium may be either removable from the computer or built in the computer. More specifically, the storage medium could be loaded into either the computer so that the computer can read the recorded program code directly or into a program reader that is connected as an external storage device to the computer.

Examples of preferred storage media include: tapes such as magnetic tapes and cassette tapes; various types of disks including magnetic disks such as flexible disks and hard disks, magneto-optical disks such as MOs and MDs, and optical discs such as CD-ROMs, DVDS, and CD-Rs; cards such as IC cards (including memory cards) and optical cards; and various types of semiconductor memories such as mask ROMs, EPROMs (erasable programmable read-only memories), EEPROMs (electrically erasable programmable read-only memories) and flash ROMs.

Alternatively, if the program is downloaded over a telecommunications network, the program preferably is transmitted as a carrier wave or a data signal in which its program code is implemented as a type of electronic transmission.

The present invention can be used effectively in various types of display devices including liquid crystal display devices, CRTs (cathode-ray tubes), organic EL display devices, plasma display panels, and SEDs (surface-conduction electron-emitter displays).

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device for conducting a display operation using a number n of primary colors, where n is a natural number that is equal to or greater than four, the display device comprising:
a video signal converting section arranged to receive an m-primary-color signal representing a number m of primary colors, where m is a natural number that is smaller than n, and arranged to convert the m-primary-color signal into an n-primary-color signal representing the n primary colors; and
a pixel including multiple subpixels; wherein
each of the multiple subpixels represents an associated one of the n primary colors;
the n primary colors include a color that is complementary to a particular one of the m primary colors; and
the video signal converting section is arranged to generate the n-primary-color signal such that if a color component representing the particular primary color of the m-primary-color signal has a negative level, the complementary primary color has an increased luminance and the other non-complementary primary colors have decreased luminances compared to a situation where the color component representing the particular primary color is zero and at least four of the subpixels included in the pixel are lit.

2. The display device of claim 1, wherein the video signal converting section is arranged to generate an isochromatic converted color signal by subjecting the m-primary-color signal to an isochromatic conversion and is arranged to generate the respective color components of the n-primary-color signal by making a linear combination of the respective color components of the isochromatic converted color signal.

3. The display device of claim 2, wherein
the isochromatic converted color signal includes the color component representing the particular primary color;
the color component representing the particular primary color, coefficients for use to make the linear combination are respectively allocated to the n primary colors; and
among the coefficients allocated to the color component representing the particular primary color, the coefficient allocated to the complementary primary color and the coefficients allocated to the other non-complementary primary colors have mutually opposite signs.

4. The display device of claim 1, wherein the video signal converting section is arranged to produce the respective color components of the n-primary-color signal by making a linear combination of the color components of the m-primary-color signal.

5. The display device of claim 4, wherein
in the color component representing the particular primary color, coefficients for use to make the linear combination are respectively allocated to the n primary colors; and
among the coefficients allocated to the color component representing the particular primary color, the coefficient allocated to the complementary primary color and the coefficients allocated to the other non-complementary primary colors have mutually opposite signs.

6. The display device of claim 1, wherein the particular primary color is red and the primary color that is complementary to the particular primary color is cyan.

7. The display device of claim 1, wherein the particular primary color is green and the primary color that is complementary to the particular primary color is magenta.

8. The display device of claim 1, wherein the particular primary color is blue and the primary color that is complementary to the particular primary color is yellow.

9. The display device of claim 1, wherein n is equal to five and m is equal to three.

10. The display device of claim 9, wherein the five primary colors are red, yellow, green, cyan and blue, and the video signal converting section is arranged to generate the five-primary-color signal such that if a color component representing the color red of the five-primary-color signal has a negative level, the color cyan that is complementary to the color red has an increased luminance and the other primary colors have decreased luminances compared to a situation where the color component representing the color red is zero.

11. The display device of claim 9, wherein the five primary colors are red, yellow, green, cyan and blue, and the video signal converting section is arranged to generate the five-primary-color signal such that if a color component representing the color blue of the five-primary-color signal has a negative level, the color yellow that is complementary to the color blue has an increased luminance and the other primary colors have decreased luminances compared to a situation where the color component representing the color blue is zero.

12. A method for generating an n-primary-color signal that represents a number n of primary colors, where n is a natural number that is equal to or greater than four, in order to conduct a display operation using the n primary colors, wherein a pixel includes multiple subpixels, each of the multiple subpixels represents an associated one of the n primary colors, the method comprising:
- a step of converting an m-primary-color signal received, representing a number m of primary colors, where is m is a natural number that is smaller than n, into the n-primary-color signal; wherein
- the n primary colors include a color that is complementary to a particular one of the m primary colors; and
- the step of converting includes generating the n-primary-color signal such that if a color component representing the particular primary color of the m-primary-color signal has a negative level, the complementary primary color has an increased luminance and the other non-complementary primary colors have decreased luminances compared to a situation where the color component representing the particular primary color is zero and at least four of the subpixels included in the pixel are lit.

13. A non-transitory computer readable medium storing a computer program with a program code for performing, when the computer program runs on a computer, a method of generating an n-primary-color signal that represents a number n of primary colors, where n is a natural number that is equal to or greater than four, in order to conduct a display operation using the n primary colors, wherein a pixel includes multiple subpixels, each of the multiple subpixels represents an associated one of the n primary colors and the method of generating comprising a step of converting an m-primary-color signal received, representing a number m of primary colors, where is m is also a natural number that is smaller than n, into the n-primary-color signal, wherein the n primary colors include a color that is complementary to a particular one of the m primary colors, and the step of converting includes generating the n-primary-color signal such that if a color component representing the particular primary color of the m-primary-color signal has a negative level, the complementary primary color has an increased luminance and the other non-complementary primary colors have decreased luminances compared to a situation where the color component representing the particular primary color is zero and at least four of the subpixels included in the pixel are lit.

\* \* \* \* \*